(12) United States Patent
Lee et al.

(10) Patent No.: US 12,195,665 B2
(45) Date of Patent: Jan. 14, 2025

(54) HEAT STORAGE MATERIAL COMPOSITION, AND HEAT STORAGE SYSTEM FOR HEATING AND COOLING BUILDING

(71) Applicant: YAZAKI CORPORATION, Tokyo (JP)

(72) Inventors: Sangbae Lee, Shizuoka (JP); Tsutomu Kagohashi, Shizuoka (JP); Shigekazu Miyashita, Shizuoka (JP); Takashi Momoi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 624 days.

(21) Appl. No.: 17/540,702

(22) Filed: Dec. 2, 2021

(65) Prior Publication Data

US 2022/0089929 A1 Mar. 24, 2022

Related U.S. Application Data

(63) Continuation of application No. PCT/JP2020/021815, filed on Jun. 2, 2020.

(30) Foreign Application Priority Data

Jun. 3, 2019 (JP) .................. 2019-103779

(51) Int. Cl.
*C09K 5/06* (2006.01)
*E04B 1/76* (2006.01)

(52) U.S. Cl.
CPC ............... *C09K 5/06* (2013.01); *C09K 5/063* (2013.01); *E04B 1/76* (2013.01)

(58) Field of Classification Search
CPC ...................................................... C09K 5/063
See application file for complete search history.

(56) References Cited

U.S. PATENT DOCUMENTS

| 4,540,502 A | 9/1985 | Kimura |
| 4,715,978 A | 12/1987 | Yano et al. |
| 2013/0105727 A1* | 5/2013 | Rieger .................. C09K 5/063 252/75 |

FOREIGN PATENT DOCUMENTS

| JP | 57-139168 A | 8/1982 |
| JP | 59-109578 A | 6/1984 |

(Continued)

OTHER PUBLICATIONS

Bo Carlsson, "Phase change behaviour of some latent heat storage media based on calcium chloride hexahydrate", Solar Energy, Apr. 2009, vol. 83, Issue 4, pp. 485-500 (8 pages total).

(Continued)

*Primary Examiner* — Peter F Godenschwager
(74) *Attorney, Agent, or Firm* — Sughrue Mion, PLLC

(57) ABSTRACT

A heat storage material composition includes a main agent composed of a calcium chloride hexahydrate, an ammonium bromide, and a potassium bromide, wherein a 5° C. range lower-limit temperature $T_{5L}$ is in a range of 15° C. or more to less than 20° C., and a 5° C. range latent heat of melting $H_5$ is 140 J/g or more. Preferably, the heat storage material composition includes 79 to 90.9 mass % of the calcium chloride hexahydrate, 2.7 to 12.3 mass % of the ammonium bromide, and 1.8 to 14.4 mass % of the potassium bromide in 100 mass % of the main agent.

7 Claims, 4 Drawing Sheets

(56) References Cited

FOREIGN PATENT DOCUMENTS

JP        61-085486 A    5/1986
WO        91/00324 A1    1/1991

OTHER PUBLICATIONS

Ouyang Dong et al., "A novel eutectic phase-change material; $CaCl_2$ ; $6H_2O$+ NH4Cl + KCl", Calphad, Dec. 2018, vol. 63, pp. 92-99 (6 pages total).
Zhang Ming, "Nano and New Materials Special", Materials Reporter, 2005, 1st edition, p. 267 (6 pages total).

* cited by examiner

HEAT STORAGE MATERIAL COMPOSITION, AND HEAT STORAGE SYSTEM FOR HEATING AND COOLING BUILDING

CROSS-REFERENCE TO RELATED APPLICATIONS

The present application is a continuation of International Application No. PCT/JP2020/021815, filed on Jun. 2, 2020, and based upon and claims the benefit of priority from Japanese Patent Application No. 2019-103779, filed on Jun. 3, 2019, the entire contents of which are incorporated herein by reference.

TECHNICAL FIELD

The present invention relates to a heat storage material composition, and a heat storage system for heating and cooling a building, and more particularly, to a heat storage material composition suitable for a heat storage system for structure heating and cooling, and a heat storage system for heating and cooling a building with the heat storage material composition.

BACKGROUND ART

Latent heat storage material compositions that utilize the latent heat generated or absorbed during the phase change from liquid to solid or from solid to liquid have been known. Latent heat storage material compositions are used, for example, in heat storage systems for structure heating and cooling.

Latent heat storage material compositions are generally to have large heat storage amount, melt and solidify in a given temperature range, be stable for a long period of time, inexpensive, non-toxic, and non-corrosive.

In addition to a total latent heat of melting $H_T$ that refers to how much heat is stored per unit weight, a latent heat storage material composition for a heat storage system for heating and cooling a structure is to absorb and radiate heat in a narrow temperature range. A large total latent heat of melting $H_T$ is preferable because it is possible to achieve sufficient heat storage with a small amount. The ability to absorb and radiate heat in a narrow range is preferable because it allows the latent heat of a material to be utilized in a temperature range of a system without unnecessary heat absorption and radiation.

For example, a 5° C. range latent heat of melting $H_5$ is used as an indicator representing "a property capable of absorbing and radiating heat in a narrow temperature range". The 5° C. range latent heat of melting $H_5$ means "the total amount of latent heat of melting in a temperature range of 5° C." and is defined as the maximum value of a total amount $Q_5$ of latent heat of melting in a temperature range from T to T+5° C. when T is changed for the total amount $Q_5$.

The above-described total latent heat of melting $H_T$ is calculated from a peak area obtained by integrating a heat flow measured by a differential scanning calorimeter (DSC) over time. In contrast, the 5° C. range latent heat of melting $H_5$ is derived as the maximum value of time integration of a heat flow measured by the differential scanning calorimeter (DSC) from a certain instant (time $t_1$, temperature $T_1$) to an instant (time $t_1$, temperature $T_1$+5) when the temperature reaches $T_1$+5° C.

FIG. 1 is a graph illustrating an example of the relationship between temperature at which latent heat of melting occurs and the heat storage amount in a latent heat storage material composition $M_A$ that is suitable for a heat storage system for heating and cooling a structure. The curve in FIG. 1 is a curve of the latent heat storage material composition $M_A$ suitable for a heat storage system for structure heating and cooling. FIG. 2 is a graph illustrating an example of the relationship between temperature at which latent heat of melting occurs and the heat storage amount in a latent heat storage material composition $M_B$ that is not suitable for the heat storage system for structure heating and cooling. The curves in FIG. 2 is a curve of the latent heat storage material composition $M_B$ not suitable for the heat storage systems for structure heating and cooling.

In the examples in FIGS. 1 and 2, temperature at which the latent heat storage material compositions start melting upon heating (melting lower-limit temperature $T_s$) is in a range of more than 15° C. and less than 20° C., which is appropriate. When a latent heat storage material composition is used in a heat storage system for structure heating and cooling, if the melting lower-limit temperature of the latent heat storage material composition is too low, it becomes difficult to solidify the heat storage material to store cold. If the melting lower-limit temperature of the latent heat storage material composition is too high, heat exchange efficiency with outside air becomes poor. Therefore, when a latent heat storage material composition is used in a heat storage system for structure heating and cooling, preferably, the temperature at which the heat storage material starts melting is in the range of 15 to 20° C., as illustrated in FIGS. 1 and 2.

Specifically, as illustrated in FIG. 1, the latent heat storage material composition $M_A$ has a small difference between the melting lower-limit temperature $T_s$ and a temperature at which melting is completed (melting upper-limit temperature $T_f$) during heating, and the melting upper-limit temperature $T_f$ is less than 26° C. In such a case, when external ambient temperature is slightly higher than the melting upper-limit temperature $T_f$ (for example, 26° C.), the heat storage amount represented by a hatched area $A_1$ in FIG. 1, that is, all of the heat storage amount inherent in the heat storage material composition can be used as cold. Thus, the latent heat storage material composition $M_A$ is suitable as a heat storage material composition for a heat storage system for cooling since all of the heat storage amount inherent can be exhibited as cold.

In contrast, as illustrated in FIG. 2, the latent heat storage material composition $M_B$ has a large difference between the melting lower-limit temperature $T_s$ and the melting upper-limit temperature $T_f$, and the melting upper-limit temperature $T_f$ exceeds 26° C. In this case, when external ambient temperature becomes 26° C. as the same as above, the heat storage amount in the temperature range from 26° C. to the melting upper-limit temperature $T_f$ does not contribute to cooling. That is, in the latent heat storage material composition $M_B$, when the external temperature exceeds 26° C., the heat storage amount represented by a hatched area $A_2$ in FIG. 2, that is, only a part of the heat storage amount inherent in the heat storage material composition can be used as cold. Thus, the latent heat storage material composition $M_B$ is not preferable as the heat storage material composition for a heat storage system for cooling.

As described above, the heat storage material composition for a heat storage system for cooling is to have a property of melting in a range of 15 to 20° C. and absorbing a large amount of heat in a narrow temperature range. Here, the 5° C. range latent heat of melting $H_5$ as an indicator representing "a property of absorbing a large amount of heat in a narrow temperature range" is described with reference to FIGS. 3 and 4. FIG. 3 is a diagram illustrating the 5° C. range latent heat of melting $H_5$ of a latent heat storage material composition suitable for a heat storage system for structure heating and cooling. The curve in FIG. 3 is a curve of the latent heat storage material composition $M_A$ suitable for a heat storage system for structure heating and cooling. FIG. 4 is a diagram illustrating the 5° C. range latent heat of melting $H_5$ of a latent heat storage material composition not suitable for a heat storage system for structure heating and cooling. The curve in FIG. 4 is a curve of the latent heat storage material composition $M_B$ that is not suitable for a heat storage system for structure heating and cooling.

As described above, the 5° C. range latent heat of melting $H_5$ means "the total amount of latent heat of melting in a temperature range of 5° C." and is defined as the maximum value of a total amount $Q_5$ of latent heat of melting in a temperature range from T to T+5° C. when T is changed for the total amount $Q_5$. Here, the lower limit of the temperature at that time is defined as a 5° C. range lower-limit temperature $T_{5L}$, and the upper limit of the temperature at that time is defined as a 5° C. range upper-limit temperature $T_{5H}$.

In the latent heat storage material composition $M_A$, the sum of the hatched area $A_1$ in FIG. 3 is the 5° C. range latent heat of melting $H_5$. The latent heat storage material composition $M_A$ has a sharp heat storage peak in a narrow temperature range, resulting in a large value of the 5° C. range latent heat of melting $H_5$. Similarly, in the latent heat storage material composition $M_B$, the sum of the hatched area $A_2$ in FIG. 4 is the 5° C. range latent heat of melting $H_5$. However, the latent heat storage material composition $M_B$ has a gradual peak shape, resulting in a small value of the 5° C. range latent heat of melting $H_5$.

Since the 5° C. range latent heat of melting $H_5$ is larger for a heat storage material that absorbs a large amount of heat in a narrow temperature range, the 5° C. range latent heat of melting $H_5$ can be used as an indicator of the property of "absorbing a large amount of heat in a narrow temperature range."

As described above, preferably, the temperature at which the heat storage material starts melting is in the range of 15 to 20° C. As illustrated in FIG. 5, there is a case where the melting lower-limit temperature $T_s$ and the 5° C. range lower-limit temperature $T_{5L}$ are significantly different from each other. When a heat storage material has the property illustrated in FIG. 5, a temperature at which the heat storage material starts melting is the melting lower-limit temperature $T_s$; however, a lower-limit temperature at which most of the heat storage material melts is the 5° C. range lower-limit temperature $T_{5L}$. Therefore, when a heat storage material has the property illustrated in FIG. 5, it is appropriate to use the 5° C. range lower-limit temperature $T_{5L}$, than the melting lower-limit temperature $T_s$ as the temperature at which the heat storage material starts melting.

As a conventional latent heat storage material composition, Patent Literature 1 (Japanese Unexamined Patent Application Publication No. 59-109578) discloses a heat storage material composition obtained by adding one or more of ammonium chloride, ammonium bromide, and ammonium nitrate to calcium chloride hexahydrate.

Patent Literature 2 (Japanese Unexamined Patent Application Publication No. 61-085486) discloses a heat storage material composition with calcium chloride hexahydrate as a main component and one or more of potassium bromide, sodium bromide, and ammonium bromide added.

SUMMARY

However, in the heat storage material compositions of Patent Literatures 1 and 2, when the amount of additives other than calcium chloride hexahydrate is large, the 5° C. range lower-limit temperature $T_{5L}$ falls within the range of 15° C. or more to less than 20° C., while the total latent heat of melting and the 5° C. range latent heat of melting $H_5$ are small. As described above, in the heat storage material compositions of Patent Literatures 1 and 2, no blend is found that has a 5° C. range lower-limit temperature $T_{5L}$ in the range of 15° C. or more to less than 20° C. and a large 5° C. range latent heat of melting.

The present invention has been made in consideration of such an issue as described above. It is an object of the present invention to provide a heat storage material composition that has a 5° C. range lower-limit temperature $T_{5L}$ in a range of 15° C. or more to less than 20° C., and a 5° C. range latent heat of melting $H_5$ of 140 J/g or more, and a heat storage system for heating and cooling a building.

A heat storage material composition according to a first aspect of the present invention includes a main agent composed of a calcium chloride hexahydrate, an ammonium bromide, and a potassium bromide, wherein a 5° C. range lower-limit temperature $T_{5L}$ is in a range of 15° C. or more to less than 20° C., and a 5° C. range latent heat of melting $H_5$ is 140 J/g or more.

In a heat storage material composition according to a second aspect of the present invention, 79 to 90.9 mass % of the calcium chloride hexahydrate, 2.7 to 12.3 mass % of the ammonium bromide, and 1.8 to 14.4 mass % of the potassium bromide are included in 100 mass % of the main agent in the heat storage material composition according to the first aspect.

In a heat storage material composition according to a third aspect of the present invention, when a content of the calcium chloride hexahydrate is defined as X mass %, a content of the ammonium bromide is defined as Y mass %, and a content of the potassium bromide is defined as Z mass % in 100 mass % of the main agent, X, Y, and Z satisfy following equations (1) to (6) in the heat storage material composition according to the first or second aspect:

[Equation 1]

$$X+Y+Z=100 \qquad (1)$$

[Equation 2]

$$+0.038X-Y-0.41\leq 0 \qquad (2)$$

[Equation 3]

$$-6.375X-Y+582.49\geq 0 \qquad (3)$$

[Equation 4]

$$-0.532X-Y+56\geq 0 \qquad (4)$$

[Equation 5]

$$+0.136X-Y+1.09\geq 0 \qquad (5)$$

[Equation 6]

$$-2.00X-Y+168.50\leq 0 \qquad (6)$$

A heat storage material composition according to a fourth aspect of the present invention further includes a first phase separation inhibitor obtained by polymerizing: at least one monomer selected from the group consisting of an organic unsaturated carboxylic acid, an organic unsaturated sulfonic acid, an organic unsaturated phosphoric acid, an organic unsaturated amide, an organic unsaturated alcohol, an organic unsaturated carboxylate, an organic unsaturated sulfonate, and an organic unsaturated phosphate; and a polyfunctional monomer in the heat storage material composition according to any one of the first to third aspects.

A heat storage material composition according to a fifth aspect of the present invention further includes at least one melting point depressant selected from the group consisting of a sodium chloride, a potassium chloride, a sodium nitrate, a sodium bromide, an ammonium chloride, an ammonium bromide, an ammonium sulfate, an ammonium nitrate, an ammonium phosphate, and a urea in the heat storage material composition according to any one of the first to fourth aspects.

A heat storage material composition according to a sixth aspect of the present invention further includes at least one supercooling inhibitor selected from the group consisting of a strontium hydroxide octahydrate, a strontium hydroxide, a strontium chloride, a strontium chloride hexahydrate, an octadecane, a decanoic acid, a viscose rayon, a bromooctadecane, a sodium monododecyl phosphate, an alumina, a propanol, a 2-propanol, a 1-propanol, a dodecyl phosphate Na, a borax $Na_2B_4O_5(OH)_4 \cdot 8H_2O$, a calcium hydroxide, a barium hydroxide, an aluminum hydroxide, a graphite, an aluminum, a titanium dioxide, a hectorite, a smectite clay, a bentonite, a laponite, a propylene glycol, an ethylene glycol, a glycerin, an ethylenediamine tetraacetic acid, a sodium alkylsulfate, a sodium alkylphosphate, a potassium alkylsulfate, and a potassium alkylphosphate in the heat storage material composition of any one of the first to fifth aspects.

A heat storage material composition according to a seventh aspect of the present invention further includes at least one second phase separation inhibitor selected from the group consisting of a sodium silicate, a water glass, a polyacrylic acid, a sodium polyacrylate, a polyacrylic ester, a copolymer of an acrylamide, an acrylic acid, and a DMAEA-MeCl, a polyacrylic ester based resin, a polyacrylamide, a polyaluminum chloride, an aluminum sulfate, a ferric polysulfate, a polycarboxylate polyether polymer, an acrylic acid-maleic acid copolymer sodium salt, an acrylic acid-sulfonic acid based monomer copolymer sodium salt, an acrylamide-dimethylaminoethyl methacrylate dimethyl sulfate copolymer, an acrylamide-sodium acrylate copolymer, a polyethylene glycol, a polypropylene glycol, a superabsorbent polymer (SAP), a carboxymethyl cellulose (CMC), a derivative of CMC, a carrageenan, a derivative of carrageenan, a xanthan gum, a derivative of the xanthan gum, a pectin, a derivative of the pectin, a starch, a derivative of the starch, a konjac, an agar, a layered silicate, and a compound substance of some of these substances in the heat storage material composition according to any one of the first to sixth aspects.

A heat storage system for heating and cooling a building according to an eighth aspect of the present invention includes a heat storage material module using a heat storage material composition according to any one of the first to seventh aspects.

DESCRIPTION OF EMBODIMENTS

Figure 1:
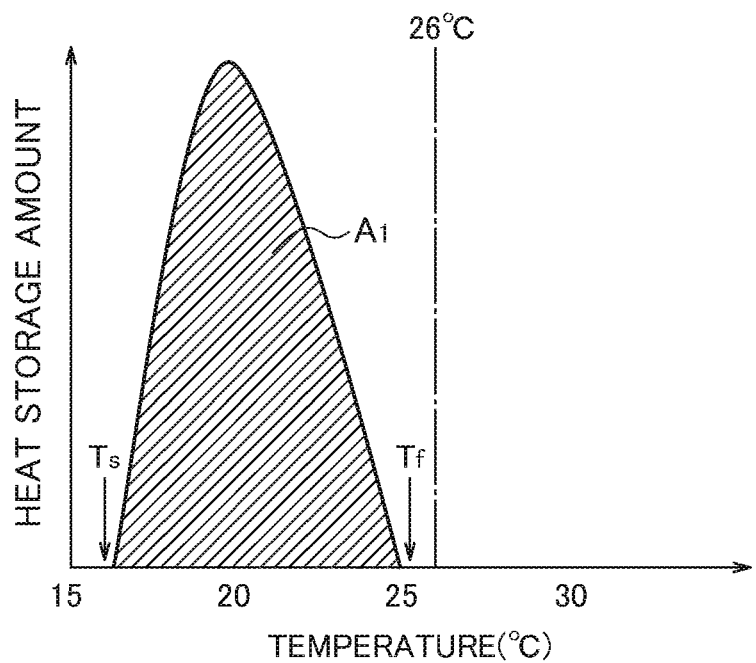
FIG. 1 is a graph illustrating an example of the relationship between temperature at which latent heat of melting occurs and the heat storage amount in a latent heat storage material composition $M_A$ that is suitable for a heat storage system for heating and cooling a structure.
Figure 2:
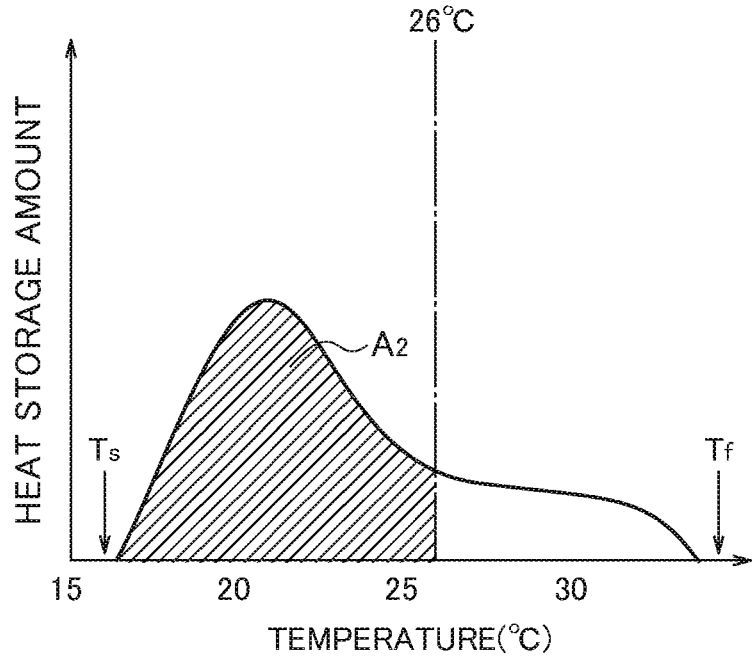
FIG. 2 is a graph illustrating an example of the relationship between temperature at which latent heat of melting occurs and the heat storage amount in a latent heat storage material composition $M_B$ that is not suitable for a heat storage system for heating and cooling a structure.
Figure 3:
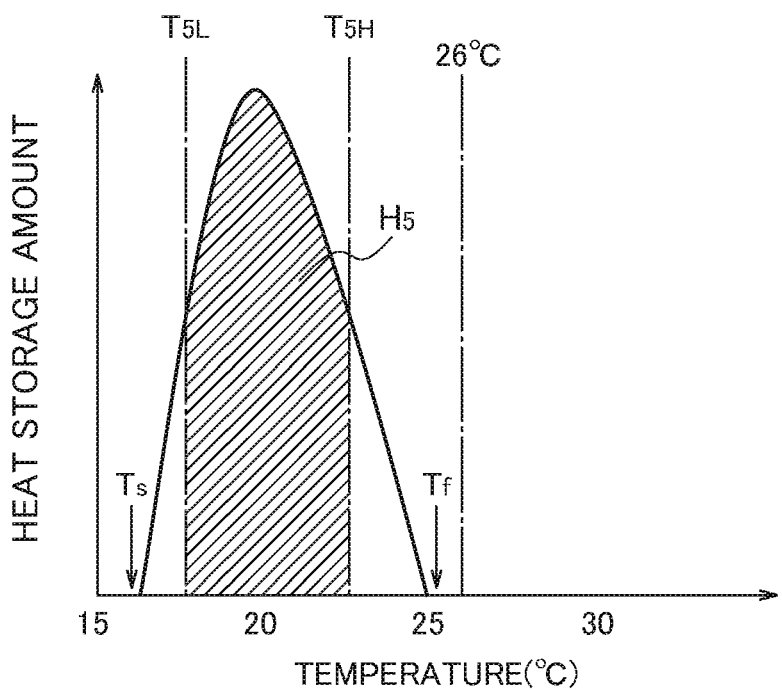
FIG. 3 is a diagram illustrating a 5° C. range latent heat of melting $H_5$ of a latent heat storage material composition suitable for a heat storage system for heating and cooling a structure.
Figure 4:
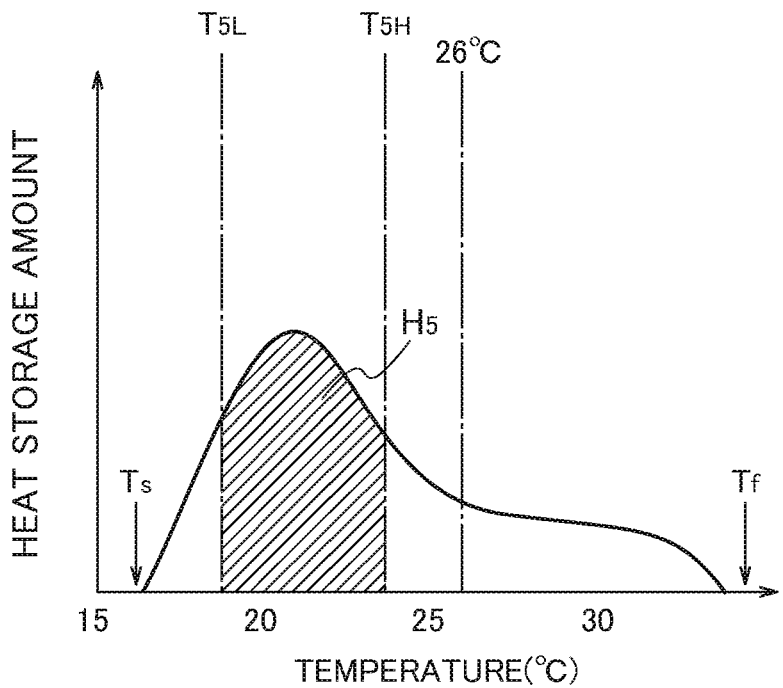
FIG. 4 is a diagram illustrating the 5° C. range latent heat of melting $H_5$ of a latent heat storage material composition not suitable for a heat storage system for heating and cooling a structure.
Figure 5:
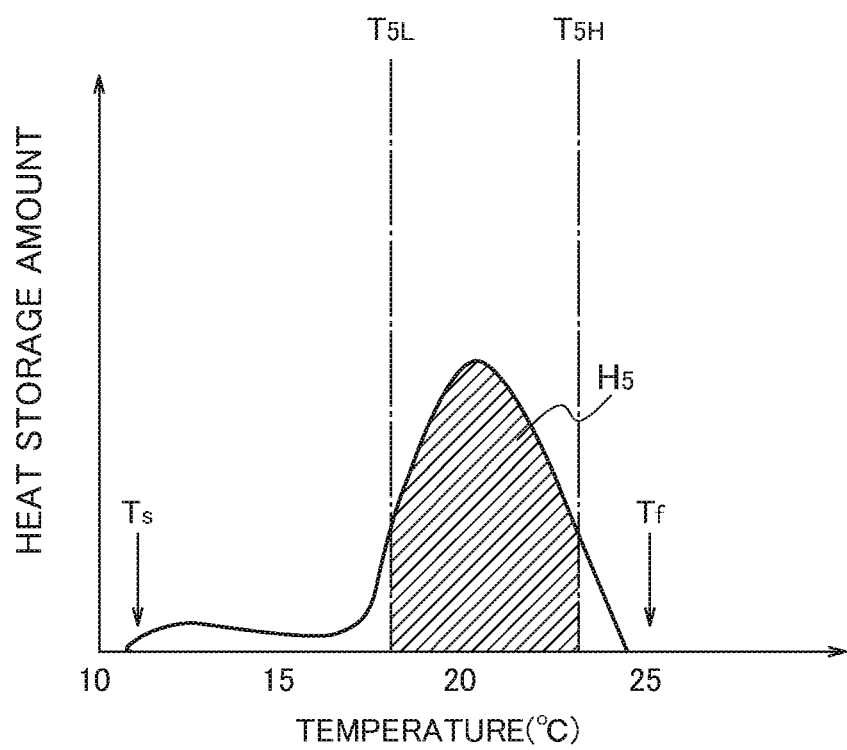
FIG. 5 is a diagram illustrating a melting lower-limit temperature $T_s$, and a 5° C. range lower-limit temperature $T_{5L}$ of a latent heat storage material composition.

A detailed description is given below of a heat storage material composition and a heat storage system according to an embodiment of the present invention.

[Heat Storage Material Composition]

A heat storage material composition according to the present embodiment includes a main agent composed of a calcium chloride hexahydrate, an ammonium bromide, and a potassium bromide.

<Calcium Chloride Hexahydrate>

As the calcium chloride hexahydrate ($CaCl_2 \cdot 6H_2O$), a known compound is usable.

The heat storage material composition according to the present embodiment usually includes 79 to 90.9 mass % of the calcium chloride hexahydrate per 100 mass % of the main agent. Here, 100 mass % of the main agent means that the total amount of the calcium chloride hexahydrate, the ammonium bromide, and the potassium bromide is 100 mass %. When the content of the calcium chloride hexahydrate is within the above-described range, a 5° C. range lower-limit temperature $T_{5L}$ of the heat storage material composition is 15° C. or more and less than 20° C., and a 5° C. range latent heat of melting $H_5$ is 140 J/g or more.

Here, the 5° C. range latent heat of melting $H_5$ means "latent heat of melting in a temperature range of 5° C." as described above and is defined as the maximum value of a total amount $Q_5$ of latent heat of melting in a temperature range of T to T+5° C. when T is changed for the total amount $Q_5$. Specifically, the 5° C. range latent heat of melting $H_5$ is derived as the maximum value of time integration of a heat flow measured by the differential scanning calorimeter (DSC) from a certain instant (time $t_1$, temperature $T_1$) to an instant (time $t_1$, temperature $T_1+5$) when the temperature reaches $T_1+5$° C.

A total latent heat of melting $H_T$ means the sum of latent heat derived during the phase change of all the heat storage material composition from solid to liquid. Specifically, the total latent heat of melting $H_T$ is calculated from a peak area obtained by integrating a heat flow measured by the differential scanning calorimeter (DSC) over time.

Preferably, the heat storage material composition according to the present embodiment includes 79.0 to 90.9 mass % of the calcium chloride hexahydrate per 100 mass % of the main agent. In this case, the heat storage amount (amount of 5° C. range latent heat of melting) of the heat storage material composition becomes larger. More preferably, the heat storage material composition according to the present embodiment includes 81.1 to 89.5 mass % of the calcium chloride hexahydrate per 100 mass % of the main agent. In this case, a melting upper-limit temperature of the heat storage material composition becomes lower.

<Ammonium Bromide>

A known ammonium bromide ($NH_4Br$) is usable.

The heat storage material composition according to the present embodiment usually includes 2.7 to 12.3 mass % of the ammonium bromide per 100 mass % of the main agent. When the content of the ammonium bromide is within the above-described range, the 5° C. range lower-limit temperature $T_{5L}$ of the heat storage material composition is 15° C. or more and less than 20° C., and the 5° C. range latent heat of melting $H_5$ is 140 J/g or more.

Preferably, the heat storage material composition according to the present embodiment includes 5.6 to 9.3 mass % of the ammonium bromide per 100 mass % of the main agent. In this case, the heat storage amount (amount of 5° C. range latent heat of melting $H_5$) of the heat storage material composition becomes larger, and the melting upper-limit temperature of the heat storage material composition becomes lower.

<Potassium Bromide>

A known potassium bromide (KBr) is usable.

The heat storage material composition according to the present embodiment usually includes 1.8 to 14.4 mass % of the potassium bromide per 100 mass % of the main agent. When the content of the potassium bromide is within the above-described range, the 5° C. range lower-limit temperature $T_{5L}$ of the heat storage material composition is 15° C. or more and less than 20° C., and the 5° C. range latent heat of melting $H_5$ is 140 J/g or more.

Preferably, the heat storage material composition according to the present embodiment includes 2.5 to 11.1 mass % of the potassium bromide per 100 mass % of the main agent. In this case, the heat storage amount (amount of 5° C. range latent heat of melting $H_5$) of the heat storage material composition becomes larger, and the melting upper-limit temperature of the heat storage material composition becomes lower.

Preferably, the heat storage material composition includes 79 to 90.9 mass % of the calcium chloride hexahydrate, 2.7 to 12.3 mass % of the ammonium bromide, and 1.8 to 14.4 mass % of the potassium bromide per 100 mass % of the main agent. When the content of each substance, such as the calcium chloride hexahydrate, is within the above-described range, the 5° C. range lower-limit temperature $T_{5L}$ of the heat storage material composition is 15° C. or more and less than 20° C., and the 5° C. range latent heat of melting $H_5$ is 140 J/g or more.

<Composition of Heat Storage Material Composition>

Preferably, the heat storage material composition has X, Y, and Z in the main agent that satisfy the following equations (1) to (6). Here, X, Y, and Z define the content of the calcium chloride hexahydrate as X mass %, the content of the ammonium bromide as Y mass %, and the content of the potassium bromide as Z mass % in the main agent.

[Equation 7]

$$X+Y+Z=100 \quad (1)$$

[Equation 8]

$$+0.038X-Y-0.41\leq 0 \quad (2)$$

[Equation 9]

$$-6.375X-Y+582.49\geq 0 \quad (3)$$

[Equation 10]

$$-0.532X-Y+56\geq 0 \quad (4)$$

[Equation 11]

$$+0.136X-Y+1.09\geq 0 \quad (5)$$

[Equation 12]

$$-2.00X-Y+168.50\leq 0 \quad (6)$$

Figure 6:
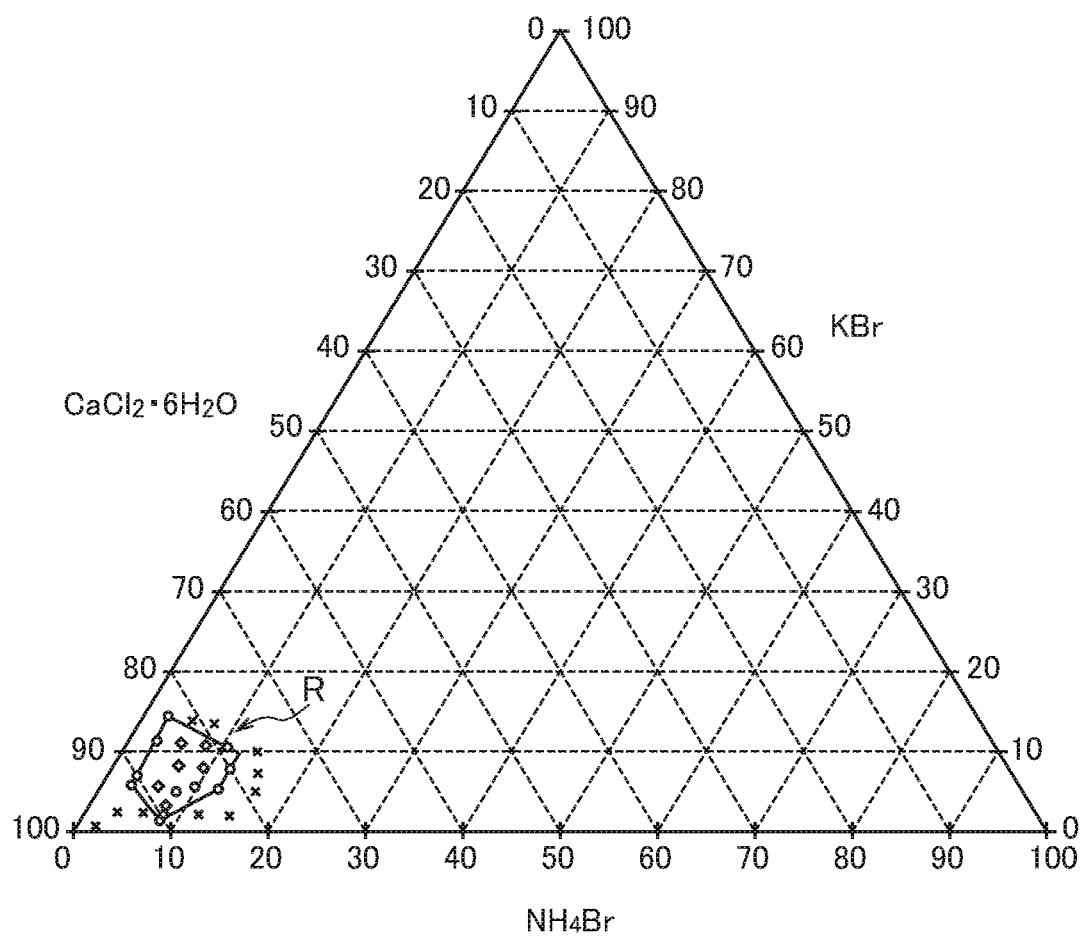
FIG. 6 is a ternary composition diagram illustrating a suitable range of contents of calcium chloride hexahydrate, ammonium bromide, and potassium bromide in a main agent.

FIG. 6 is a ternary composition diagram illustrating a suitable range of contents of the calcium chloride hexahydrate, the ammonium bromide, and the potassium bromide in the main agent. A pentagon R in FIG. 6 and its interior are in a range satisfying the above-described equations (1) to (6).

In the heat storage material composition according to the present embodiment, when the above-described X, Y, and Z satisfy the following equations (1) to (6), the 5° C. range lower-limit temperature $T_{5L}$ of the heat storage material composition is 15° C. or more and less than 20° C., and the 5° C. range latent heat of melting $H_5$ is 140 J/g or more.

(First Phase Separation Inhibitor)

Preferably, the heat storage material composition according to the present embodiment further includes a specific first phase separation inhibitor. The heat storage material composition including the specific first phase separation inhibitor preserves the main agent under moisture retention. The specific first phase separation inhibitor is obtained by polymerizing a specific monomer and a polyfunctional monomer.

<Monomer>

The specific monomer used is at least one monomer selected from the group consisting of an organic unsaturated carboxylic acid, an organic unsaturated sulfonic acid, an organic unsaturated phosphoric acid, an organic unsaturated amide, an organic unsaturated alcohol, an organic unsaturated carboxylate, an organic unsaturated sulfonate, and an organic unsaturated phosphate.

Examples of the organic unsaturated carboxylic acid used include one or more unsaturated carboxylic acids selected from the group consisting of an acrylic acid, a methacrylic acid, and an itaconic acid. Preferably, the acrylic acid is used as the organic unsaturated carboxylic.

Examples of the organic unsaturated sulfonic acid used include one or more selected from the group consisting of a 2-acrylamide-2-methylpropane sulfonic acid, a p-styrene sulfonic acid, a sulfoethyl methacrylate, an allyl sulfonic acid, and a methallyl sulfonic acid.

Examples of the organic unsaturated carboxylate used include an alkali metal salt or an ammonium salt of the above-described unsaturated carboxylic acid. As the alkali metal salt of the above-described unsaturated carboxylic acid, a sodium salt of the above-described unsaturated carboxylic acid is used, for example. Preferably, as the sodium salt of the above-described unsaturated carboxylic acid, sodium acrylate, or sodium methacrylate is used.

Examples of the organic unsaturated sulfonate used include an alkali metal salt and an ammonium salt of the above-described organic unsaturated sulfonic acid. As the alkali metal salt of the above-described organic unsaturated sulfonic acid, a sodium salt of the above-described organic unsaturated sulfonic acid is used, for example.

When the above-described specific monomer is polymerized as it is, it forms a polymer with the specific monomer polymerized.

<Polyfunctional Monomer>

A polyfunctional monomer cross-links a polymer with the specific monomer polymerized. Examples of the polyfunctional monomer used include an N,N'-methylenebisacrylamide, an N,N'-methylenebismethacrylamide, an N,N'-dimethylenebisacrylamide, and an N,N'-dimethylenebismethacrylamide. Preferably, a N,N'-methylenebisacrylamide, or a N,N'-methylenebismethacrylamide is used as the polyfunctional monomer.

(Melting Point Depressant)

Preferably, the heat storage material composition according to the present embodiment further includes a specific melting point depressant. It lowers the melting point of the main agent. Examples of the melting point depressant include at least one selected from the group consisting of a sodium chloride, a potassium chloride, a sodium nitrate, a sodium bromide, an ammonium chloride, an ammonium bromide, an ammonium sulfate, an ammonium nitrate, an ammonium phosphate, and a urea.

(Supercooling Inhibitor)

Preferably, the heat storage material composition according to the present embodiment further includes a specific supercooling inhibitor. It inhibits supercooling of the main agent. Examples of the supercooling inhibitor used include at least one selected from the group consisting of a strontium hydroxide octahydrate, a strontium hydroxide, a strontium chloride, a strontium chloride hexahydrate, an octadecane, a decanoic acid, a viscose rayon, a bromooctadecane, a sodium monododecyl phosphate, an alumina, a propanol, a 2-propanol, a 1-propanol, a dodecyl phosphate Na, a borax $Na_2B_4O_5(OH)_4 \cdot 8H_2O$, a calcium hydroxide, a barium hydroxide, an aluminum hydroxide, a graphite, an aluminum, a titanium dioxide, a hectorite, a smectite clay, a bentonite, a laponite, a propylene glycol, an ethylene glycol, a glycerin, an ethylenediamine tetraacetic acid, a sodium alkylsulfate, a sodium alkylphosphate, a potassium alkylsulfate, and a potassium alkylphosphate.

(Second Phase Separation Inhibitor)

Preferably, the heat storage material composition according to the present embodiment further includes a specific second phase separation inhibitor. It inhibits phase separation of the main agent. Examples of the second phase separation inhibitor used include at least one selected from the group consisting of a sodium silicate, a water glass, a polyacrylic acid, a sodium polyacrylate, a polyacrylic ester, a copolymer of an acrylamide, an acrylic acid, and a DMAEA-MeCl, a polyacrylic ester based resin, a polyacrylamide, a polyaluminum chloride, an aluminum sulfate, a ferric polysulfate, a polycarboxylate polyether polymer, an acrylic acid-maleic acid copolymer sodium salt, an acrylic acid-sulfonic acid based monomer copolymer sodium salt, an acrylamide-dimethylaminoethyl methacrylate dimethyl sulfate copolymer, an acrylamide-sodium acrylate copolymer, a polyethylene glycol, a polypropylene glycol, a superabsorbent polymer (SAP), a carboxymethyl cellulose (CMC), a derivative of CMC, a carrageenan, a derivative of carrageenan, a xanthan gum, a derivative of the xanthan gum, a pectin, a derivative of the pectin, a starch, a derivative of the starch, a konjac, an agar, a layered silicate, and a compound substance of some of the above-described substances.

(Property)

The heat storage material composition according to the present embodiment has the 5° C. range lower-limit temperature $T_{5L}$ of 15° C. or more and less than 20° C. and exhibits heat storage performance in a temperature range suitable as a latent heat storage material composition for a heat storage system for heating and cooling a structure. Therefore, the heat storage material composition according to the present embodiment is suitable as a latent heat storage material composition for a heat storage system for heating and cooling a structure.

The heat storage material composition according to the present embodiment has the 5° C. range lower-limit temperature $T_{5L}$ of 15° C. or more and less than 20° C., preferably 16° C. or more and less than 19° C., more preferably 17° C. or more and less than 18° C. As the 5° C. range lower-limit temperature $T_{5L}$ is within the above-described numerical range, the heat storage material composition according to the present embodiment exhibits heat storage performance in a temperature range suitable as a latent heat storage material composition for a heat storage system for heating and cooling a structure. Therefore, the heat storage material composition according to the present embodiment is suitable as a latent heat storage material composition for a heat storage system for heating and cooling a structure.

The heat storage material composition according to the present embodiment has the 5° C. range latent heat of melting $H_5$ of 140 J/g or more, more preferably 150 J/g or more, still more preferably 160 J/g or more. In the heat storage material composition according to the present embodiment, the 5° C. range latent heat of melting $H_5$ is particularly preferably 170 J/g or more, more particularly preferably 180 J/g or more. As the latent heat of melting the 5° C. range latent heat of melting $H_5$ falls within the above-described numerical range, the heat storage material composition according to the present embodiment is suitable as a latent heat storage material composition for a heat storage system for heating and cooling a structure.

In the heat storage material composition according to the present embodiment, the total latent heat of melting $H_T$ is preferably 150 J/g or more, more preferably 160 J/g or more, still more preferably 170 J/g or more, particularly preferably 180 J/g or more, more particularly preferably 190 J/g or more. As the total latent heat of melting $H_T$ is within the above-described numerical range, the heat storage material composition according to the present embodiment is suitable as a latent heat storage material composition for a heat storage system for heating and cooling a structure.

(Effect)

According to the heat storage material composition according to the present embodiment, there is obtained the heat storage material composition having the 5° C. range lower-limit temperature $T_{5L}$ of 15° C. or more and less than 20° C., and the 5° C. range latent heat of melting $H_5$ of 140 J/g or more.

[Heat Storage System for Heating and Cooling Building]

The heat storage system for heating and cooling a building according to the present embodiment includes a heat storage material module using the heat storage material composition according to the above-described embodiment.

(Heat Storage Material Module)

As the heat storage material module, for example, the above-described heat storage material composition is filled in a container having a sufficient sealing property to be a heat storage material pack, and one or a plurality of the heat storage material packs are stacked and provided with an appropriate flow path to be modularized for use. Examples of the container used for the heat storage material pack include an aluminum pack formed by thermally welding an aluminum pack sheet formed by stacking resin sheets on an aluminum sheet. The heat storage material module is installed on at least a part of a floor surface, a wall surface, or a ceiling surface, each dividing a space in a structure.

The heat storage material module installed in this way stores heat (stores cold) by heat exchange between a module surface and an atmosphere ventilated on the module surface, solar radiation heat due to solar radiation, an air conditioning system utilizing nighttime electric power, and the like. For example, in the daytime, the heat storage material composition in the heat storage material module melts by heat obtained from a space in a structure and retains the enthalpy for that inside the heat storage material composition. Thereafter, when the outside air temperature drops at night, the melted heat storage material composition solidifies and releases heat into the space in the structure. Thus, installation of the heat storage material module in a building reduces the energy load for heating and cooling by the action of melting and solidification of the heat storage material composition.

(Effect)

The heat storage material system according to the present embodiment reduces energy load for heating and cooling by storing heat (storing cold) by heat exchange between a module surface and an atmosphere ventilated on the module surface, solar radiation heat due to solar radiation, an air conditioning system utilizing nighttime electric power, and the like.

EXAMPLES

Hereinafter, the present invention is described in more detail with reference to Examples and Comparative Examples, but the present invention is not limited to these Examples.

Example 1

(Preparation of Heat Storage Material Composition)

A calcium chloride (manufactured by KISHIDA CHEMICAL Co., Ltd., guaranteed reagent), an ammonium bromide (manufactured by KISHIDA CHEMICAL Co., Ltd., guaranteed reagent), and a potassium bromide (manufactured by KISHIDA CHEMICAL Co., Ltd., guaranteed reagent) were prepared.

Predetermined amounts of the calcium chloride hexahydrate, the ammonium bromide, and the potassium bromide were mixed in a 20 ml glass sample bottle to make a total of about 5 g. The amounts of the calcium chloride, the ammonium bromide, the potassium bromide, and pure water were mixed in such a way that the composition of the resulting heat storage material composition would have the composition in Table 1. The amount of the pure water was weighed and mixed in a predetermined amount so that all of the calcium chloride became calcium chloride hexahydrate. The amount of pure water added in this case was equal to or less than ±1% difference from the nominal amount added, which was calculated from the amount of the calcium chloride added.

When the resulting mixture was warmed with hot water at 50° C. or higher, a heat storage material composition was obtained (sample No. A11).

The formation of precipitation during the preparation of the heat storage material composition was also investigated. The formation of precipitation during the preparation of the heat storage material composition is an indicator that the property stability of the heat storage material composition is low when repeated solidification and melting occurs. In the heat storage material composition of sample No. A11, no precipitation was formed. The results are shown in Table 1.

TABLE 1

| | | Material properties | | | | | | |
|---|---|---|---|---|---|---|---|---|
| | | Heat storage material composition Content in main agent (mass %) | | | Precipitation | Total latent heat of melting (J/g) | 5° C. range latent heat of melting (J/g) | 5° C. range lower-limit temperature $T_{5L}$(° C.) | Symbol in figure |
| Example No. | Sample No. | $CaCl_2 \cdot 6H_2O$ (X) | $NH_4Br$ (Y) | KBr (Z) | formation during preparation | | | | |
| Example 1 | A11 | 89.5 | 8.0 | 2.5 | No | 176.0 | 176.0 | 17.8 | ◇ |
| Example 2 | A12 | 88.2 | 5.9 | 5.9 | No | 191.0 | 181.0 | 17.8 | ◇ |
| Example 3 | A13 | 85.1 | 6.4 | 8.5 | No | 183.0 | 183.0 | 16.3 | ◇ |
| Example 4 | A14 | 82.5 | 9.3 | 8.2 | No | 180.0 | 180.0 | 15.2 | ◇ |
| Example 5 | A15 | 88.5 | 7.9 | 3.6 | No | 175.0 | 175.0 | 17.2 | ◇ |
| Example 6 | A16 | 83.3 | 5.6 | 11.1 | No | 179.9 | 179.9 | 16.2 | ◇ |
| Example 7 | A17 | 81.1 | 8.1 | 10.8 | No | 176.6 | 176.6 | 15.4 | ◇ |
| Example 8 | A18 | 90.9 | 3.0 | 6.1 | No | 200.7 | 156.9 | 19.5 | ○ |
| Example 9 | A19 | 84.5 | 9.9 | 5.6 | No | 168.2 | 164.0 | 16.3 | ○ |
| Example 10 | A20 | 82.2 | 12.3 | 5.5 | No | 157.3 | 146.6 | 15.3 | ○ |
| Example 11 | A21 | 90.1 | 2.7 | 7.2 | No | 164.0 | 143.0 | 17.8 | ○ |
| Example 12 | A22 | 80.0 | 12.0 | 8.0 | No | 141.4 | 141.4 | 15.2 | ○ |
| Example 13 | A23 | 90.1 | 8.1 | 1.8 | No | 186.8 | 161.0 | 18.4 | ○ |
| Example 14 | A24 | 87.1 | 7.8 | 5.2 | No | 170.5 | 168.3 | 16.2 | ○ |
| Example 15 | A25 | 85.7 | 2.9 | 11.4 | No | 179.8 | 160.4 | 17.6 | ○ |
| Example 16 | A26 | 79.0 | 10.5 | 10.5 | No | 169.2 | 168.2 | 15.0 | ○ |
| Example 17 | A27 | 82.9 | 2.7 | 14.4 | No | 161.6 | 136.4 | 17.2 | ○ |

(Measurement of Total Latent Heat of Melting $H_T$, 5° C. Range Latent Heat of Melting $H_5$, and 5° C. Range Lower-Limit Temperature $T_{5L}$)

A sample of about 10 mg was taken from the heat storage material composition, and the total latent heat of melting $H_T$, the 5° C. range latent heat of melting $H_5$, and the 5° C. range lower-limit temperature $T_{5L}$ of the heat storage material composition were measured by DSC (differential scanning calorimeter). The total latent heat of melting $H_T$ was calculated from a peak area obtained by integrating a heat flow measured by the differential scanning calorimeter (DSC) over time. The 5° C. range latent heat of melting $H_5$ was derived as the maximum value of time integration of a heat flow measured by the differential scanning calorimeter (DSC) from a certain instant (time $t_1$, temperature $T_1$) to an instant (time $t_1$, temperature $T_1+5$) when the temperature reaches $T_1+5°$ C. The 5° C. range lower-limit temperature $T_{5L}$ was derived as the lower limit temperature at that time. These results are shown in Table 1.

Example 2 to 17 and Comparative Examples 1 to 10

Heat storage material compositions were obtained in the same manner as in Example 1 except that the amounts of the calcium chloride hexahydrate, the ammonium bromide, the potassium bromide, and the pure water were changed so that the resulting heat storage material composition had the composition in Table 1 or Table 2 (Sample No. A1 to A10, A12 to A27).

Sample No. A1 to A10 are the heat storage material compositions of Comparative Examples 1 to 10, and sample No. A12 to A27 are the heat storage material compositions of Examples 2 to 17, respectively.

TABLE 2

| | | Heat storage matieral composition Content in main agent (mass %) | | | Material properties | | | | |
|---|---|---|---|---|---|---|---|---|---|
| Example No. | Sample No. | $CaCl_2 \cdot 6H_2O$ (X) | $NH_4Br$ (Y) | KBr (Z) | Precipitation formation during preparation | Total latent heat of melting (J/g) | 5° C. range latent heat of melting (J/g) | 5° C. range lower-limit temperature $T_{5L}$(° C.) | Symbol in figure |
| Comparative Example 1 | A1 | 82.6 | 15.1 | 2.3 | Yes | — | — | — | X |
| Comparative Example 2 | A2 | 78.4 | 16.3 | 5.2 | Yes | — | — | — | X |
| Comparative Example 3 | A3 | 76.9 | 15.4 | 7.7 | Yes | — | — | — | X |
| Comparative Example 4 | A4 | 75.9 | 13.9 | 10.1 | Yes | — | — | — | X |
| Comparative Example 5 | A5 | 80.7 | 5.3 | 14.0 | Yes | — | — | — | X |
| Comparative Example 6 | A6 | 78.6 | 7.7 | 13.7 | Yes | — | — | — | X |
| Comparative Example 7 | A7 | 97.3 | 1.8 | 14.0 | No | 138.7 | 89.0 | 23.2 | X |
| Comparative Example 8 | A8 | 94.0 | 3.4 | 14.0 | No | 200.7 | 65.3 | 21.4 | X |
| Comparative Example 9 | A9 | 91.3 | 6.2 | 14.0 | No | 172.0 | 124.0 | 18.9 | X |
| Comparative Example 10 | A10 | 85.9 | 11.8 | 13.7 | No | 140.8 | 111.7 | 17.5 | X |

With respect to sample No. A1 to A10 and A12 to A27, the formation of precipitation of the heat storage material composition was investigated in the same manner as in Example 1. With respect to sample No. A1 to A10 and A12 to A27, the total latent heat of melting $H_T$, the 5° C. range latent heat of melting $H_5$, and the 5° C. range lower-limit temperature $T_{5L}$ were measured in the same manner as in Example 1.

The results are shown in Tables 1 and 2.

(Ternary Composition Diagram)

FIG. 6 is a ternary composition diagram illustrating a suitable range of contents of the calcium chloride hexahydrate, the ammonium bromide, and the potassium bromide in the main agent.

The compositions of the heat storage material compositions of sample No. A1 to A27 were plotted in FIG. 6.

In the heat storage material compositions of sample No. A18 to A27 (Examples 8 to 17), the 5° C. range lower-limit temperature $T_{5L}$ was 15° C. or more and less than 20° C., and the 5° C. range latent heat of melting $H_5$ was 140 J/g or more. FIG. 6 shows plots of the heat storage material compositions of sample No. A18 to A27 with a symbol ○.

In the heat storage material compositions of sample No. A11 to A17 (Examples 1 to 7), the 5° C. range lower-limit temperature $T_{5L}$ was 15° C. or more and less than 20° C., and the 5° C. range latent heat of melting $H_5$ was 175 J/g or more. FIG. 6 shows plots of the heat storage compositions of sample No. A11 to A17 with a symbol ◇.

Having higher 5° C. range latent heat of melting $H_5$, the heat storage material compositions of sample No. A11 to A17 indicated by the symbol ◇ are more suitable than those of sample No. A18 to A27 indicated by the symbol ○.

FIG. 6 shows plots of the heat storage material compositions of sample No. A1 to A10 with a symbol x. The heat storage material compositions of sample No. A1 to A6 (Comparative Examples 1 to 6) were not measured by DSC because precipitation was formed during preparation. Sample No. A7 to A10 (Comparative Examples 7 to 10) had the 5° C. range latent heat of melting $H_5$ equal to or less than 140 J/g.

The symbols ◇, ○, and x indicate that the former is more preferable.

In FIG. 6, a pentagonal region R is a region in which sample No. A18 to A27 (Examples 8 to 17) with the plot symbol ○, and sample No. A11 to A17 (Examples 1 to 7) with the plot symbol ◇ are present.

In FIG. 6, the pentagonal region R is a region in which X, Y, and Z satisfy the following equations (1) to (6). In equations (1) to (6), the content of the calcium chloride hexahydrate, the content of the ammonium bromide, and the content of the potassium bromide in 100 mass % of the main agent were defined as X mass %, Y mass %, and Z mass %, respectively.

[Equation 13]

$$X+Y+Z=100 \quad (1)$$

[Equation 14]

$$+0.038X-Y-0.41\leq 0 \quad (2)$$

[Equation 15]

$$-6.375X-Y+582.49\geq 0 \quad (3)$$

[Equation 16]

$$-0.532X-Y+56\geq 0 \quad (4)$$

[Equation 17]

$$+0.136X-Y+1.09\geq 0 \quad (5)$$

[Equation 18]

$$-2.00X-Y+168.50\leq 0 \quad (6)$$

The pentagonal region R in FIG. 6 is a region in which sample No. A18 to A27 (Examples 8 to 17) with the plot symbol ○, and sample No. A11 to A17 (Examples 1 to 7) with the plot symbol ◇ are present. That is, the region R is a region in which the heat storage material composition has the 5° C. range lower-limit temperature $T_{5L}$ of 15° C. or more and less than 20° C., and the 5° C. range latent heat of melting $H_5$ of 140 J/g or more. Therefore, the region R where X, Y, and Z satisfy the above equations (1) to (6) indicates a region where a suitable heat storage material composition is obtained.

The entire contents of Japanese Patent Application No. 2019-103779 (filed on: Jun. 3, 2019) are incorporated herein by reference.

Although the present invention has been described by way of examples, the present invention is not limited thereto, and various modifications are possible within the scope of the gist of the present invention.

INDUSTRIAL APPLICABILITY

In the heat storage material composition according to the present embodiment, there is provided a heat storage material composition having the 5° C. range lower-limit temperature $T_{5L}$ in the range of 15° C. or more to less than 20° C., and the 5° C. range latent heat of melting $H_5$ of 140 J/g or more, and a heat storage system for heating and cooling a building.

What is claimed is:

1. A heat storage material composition, comprising:
a main agent composed of a calcium chloride hexahydrate, an ammonium bromide, and a potassium bromide, wherein
79 to 90.9 mass % of the calcium chloride hexahydrate, 2.7 to 12.3 mass % of the ammonium bromide, and 1.8 to 14.4 mass % of the potassium bromide are included in 100 mass % of the main agent, and
a 5° C. range lower-limit temperature $T_{5L}$ is in a range of 15° C. or more to less than 20° C., and a 5° C. range latent heat of melting $H_5$ is 140 J/g or more.

2. The heat storage material composition according to claim 1, wherein when a content of the calcium chloride hexahydrate is defined as X mass %, a content of the ammonium bromide is defined as Y mass %, and a content of the potassium bromide is defined as Z mass % in 100 mass % of the main agent, X, Y, and Z satisfy following equations (1) to (6):

[Equation 1]

$$X+Y+Z=100 \quad (1)$$

[Equation 2]

$$+0.038X-Y-0.41\leq 0 \quad (2)$$

[Equation 3]

$$-6.375X-Y+582.49\geq 0 \quad (3)$$

[Equation 4]

$$-0.532X - Y + 56 \geq 0 \quad (4)$$

[Equation 5]

$$+0.136X - Y + 1.09 \geq 0 \quad (5)$$

[Equation 6]

$$-2.00X - Y + 168.50 \leq 0 \quad (6).$$

3. The heat storage material composition according to claim 1, further comprising a first phase separation inhibitor obtained by polymerizing:
  at least one monomer selected from the group consisting of an organic unsaturated carboxylic acid, an organic unsaturated sulfonic acid, an organic unsaturated phosphoric acid, an organic unsaturated amide, an organic unsaturated alcohol, an organic unsaturated carboxylate, an organic unsaturated sulfonate, and an organic unsaturated phosphate; and
  a polyfunctional monomer.

4. The heat storage material composition according to claim 1, further comprising at least one melting point depressant selected from the group consisting of a sodium chloride, a potassium chloride, a sodium nitrate, a sodium bromide, an ammonium chloride, an ammonium sulfate, an ammonium nitrate, an ammonium phosphate, and a urea.

5. The heat storage material composition according to claim 1, further comprising:
  at least one supercooling inhibitor selected from the group consisting of a strontium hydroxide octahydrate, a strontium hydroxide, a strontium chloride, a strontium chloride hexahydrate, an octadecane, a decanoic acid, a viscose rayon, a bromooctadecane, a sodium monododecyl phosphate, an alumina, a propanol, a 2-propanol, a 1-propanol, a dodecyl phosphate Na, a borax $Na_2B_4O_5(OH)_4 \cdot 8H_2O$, a calcium hydroxide, a barium hydroxide, an aluminum hydroxide, a graphite, an aluminum, a titanium dioxide, a hectorite, a smectite clay, a bentonite, a laponite, a propylene glycol, an ethylene glycol, a glycerin, an ethylenediamine tetraacetic acid, a sodium alkylsulfate, a sodium alkylphosphate, a potassium alkylsulfate, and a potassium alkylphosphate.

6. The heat storage material composition according to claim 1, further comprising:
  at least one second phase separation inhibitor selected from the group consisting of a sodium silicate, a water glass, a polyacrylic acid, a sodium polyacrylate, a polyacrylic ester, a copolymer of an acrylamide, an acrylic acid, a DMAEA-MeCl, a polyacrylic ester based resin, a polyacrylamide, a polyaluminum chloride, an aluminum sulfate, a ferric polysulfate, a polycarboxylate polyether polymer, an acrylic acid-maleic acid copolymer sodium salt, an acrylic acid-sulfonic acid based monomer copolymer sodium salt, an acrylamide-dimethylaminoethyl methacrylate dimethyl sulfate copolymer, an acrylamide-sodium acrylate copolymer, a polyethylene glycol, a polypropylene glycol, a superabsorbent polymer (SAP), a carboxymethyl cellulose (CMC), a derivative of CMC, a carrageenan, a derivative of carrageenan, a xanthan gum, a derivative of the xanthan gum, a pectin, a derivative of the pectin, a starch, a derivative of the starch, a konjac, an agar, a layered silicate, and a compound substance of some of these substances.

7. A heat storage system for heating and cooling a building, comprising:
  a heat storage material module using the heat storage material composition according to claim 1.

\* \* \* \* \*